United States Patent [19]

Gelardi et al.

[11] Patent Number: 5,123,526
[45] Date of Patent: Jun. 23, 1992

[54] RACK PACKAGE

[75] Inventors: Paul J. Gelardi, P.O. Box 127, Cape Porpoise, Me. 04014; John A. Gelardi, Cape Porpoise, Me.

[73] Assignee: Paul J. Gelardi, Kennebunkport, Me.

[21] Appl. No.: 622,483

[22] Filed: Dec. 5, 1990

[51] Int. Cl.⁵ .................. B65D 85/57; B65D 85/672
[52] U.S. Cl. .................. 206/45.19; 206/309; 206/444; 206/564
[58] Field of Search ........... 206/309, 312, 387, 425, 206/444, 564, 45.14, 45.19; 211/40, 41

[56] References Cited

U.S. PATENT DOCUMENTS

| | | |
|---|---|---|
| 3,716,145 | 2/1973 | Gutierrez . |
| 3,756,383 | 9/1973 | Kryter . |
| 3,897,871 | 8/1975 | Zinnbauer . |
| 4,212,401 | 7/1980 | Schweizer . |
| 4,316,539 | 2/1982 | Torrington . |
| 4,381,836 | 5/1983 | Rivkin et al. . |
| 4,512,468 | 4/1985 | Stravitz ............................. 206/564 |
| 4,518,085 | 5/1985 | Chisholm et al. . |
| 4,523,680 | 6/1985 | Saito et al. . |
| 4,558,782 | 12/1985 | Iverson et al. . |
| 4,567,983 | 2/1986 | Morris . |
| 4,595,098 | 6/1986 | Kryter ............................. 206/564 |
| 4,627,532 | 12/1986 | Clemens . |
| 4,627,535 | 12/1986 | Kirchner et al. . |
| 4,629,067 | 12/1986 | Pavlik et al. . |
| 4,634,004 | 1/1987 | Mortensen . |
| 4,657,146 | 4/1987 | Walters . |
| 4,712,679 | 12/1987 | Lowe . |
| 4,718,547 | 1/1988 | MacTavish . |
| 4,759,442 | 7/1988 | Gregerson et al. . |
| 4,760,914 | 8/1988 | Gelardi et al. . |
| 4,771,890 | 9/1988 | Hofland et al. . |
| 4,779,730 | 10/1988 | Hartsfield et al. . |
| 4,781,292 | 11/1988 | Sacherman et al. . |
| 4,805,769 | 2/1989 | Soltis et al. . |
| 4,815,600 | 3/1989 | Niles et al. . |
| 4,819,797 | 4/1989 | Holmgren . |
| 4,834,238 | 5/1989 | Hehn et al. . |
| 4,850,477 | 7/1989 | Gelardi et al. . |
| 4,865,190 | 9/1989 | Gregerson et al. . |
| 4,871,065 | 10/1989 | Hehn et al. ............................. 206/387 |

FOREIGN PATENT DOCUMENTS

112507 11/1988 European Pat. Off. .

*Primary Examiner*—David T. Fidei
*Attorney, Agent, or Firm*—James Creighton Wray

[57] ABSTRACT

A compact disk package and storage rack opens along one full side to allow a compact disk to slide into the rack to create a package. An entire side of the package folds upward and snaps into locked position for retain packaging of the compact disk to provide display space and to prevent theft. After the compact disk is purchased in the retailer package, the package is used as a compact disk storage rack by standing individual boxes containing the compact disks in aligned order to slots created between opposing tabs.

15 Claims, 6 Drawing Sheets

RACK PACKAGE

BACKGROUND OF THE INVENTION

Thin record media is often supplied in disk form. Disks have cases which are usually relatively rigid compared to the disks. Of primary interest are compact disks known as CD disks in which digital information is optically stored and which are read by machines often to reproduce music. The disks are usually stored in thin rigid plastic cases which have become standardized and which are known as Philip Jewel Boxes. Other cases for disks such as the relatively rigid cardboard cases which hold magnetic recording media floppy disks or mini or micro magnetic disks in more rigid cases, or other records such as, for example, microfiche records in thin cases, or photographic or other records in thin cases or magnetic reel-stored tapes in thin cases may be employed.

Storage racks for such cases for record media are known. Some of the racks are intended to be used as packages for retailing the media in the cases.

Racks and packages of that nature have several drawbacks. For example, they increase thickness, weight and costs of the packages. Increase thickness and weight means increased shipping costs and fewer products within a similar size containers or larger heavier containers for the same number of products. Packaging materials from which the rack packages are made eventually add to the burden of storage and landfill and thus add an additional economic burden. Rack packages of the prior art are either thick and cumbersome, uneconomic, or difficult to assemble or all three.

Other disadvantages of the prior art may be readily determined by reviewing the prior art which is cited in the present case, for example.

SUMMARY OF THE INVENTION

The present invention overcomes and avoids problems of the prior art by providing a thin, lightweight, one-piece rack package in which products can be stored without adding appreciable weight or thickness due to packaging. The contents may be easily inserted when closing the package, and the package may be readily opened and converted to rack use with minimal steps.

The present invention provides a plastic CD retailer and CD case flip file. Most CD plastic retailers to date have been disposable without a use other than retailing. Most current flip file type storage systems do not act as anti-theft retailer, and some are made from six pieces. A current retailer-filing rack is made of several parts which must be fitted together before and after the contents are inserted.

The present CD rack is used for merchandising up to two compact discs in an anti-theft tamper-proof package, and also be used for a storage system holding up to 18 compact discs in standard Philip Jewel cases.

The CD storage rack is designed to hold compact discs in two types of configurations, one being as a retailer where the CD box is inserted into the side of the rack's frame and locked into place, and the other being a rack, where cases are in upright positions in eighteen possible slots. In the retailer use, the CD box is held in place by flanges protruding inwardly from the rack's edges and a middle support bar. The CD box at the same time is enclosed by the side walls of the rack, wherein one of the side walls is hinged to provide a means to insert and remove the CD and/or display card from the interior. The side portion has snaps or locks for preventing the theft of the compact disk from the CD box. When used as an organizer, the rack has slots for up to eighteen compact disk boxes. These slots are recessed into the rack and are made up of two groups of nine slots running perpendicular to the axis of the length of the rack. The dividers act as supports for holding the corners of the CD back to keep the CD in an upright, visible position when the rack is lying flat on a surface. Further, the bottom edges of the dividers incorporate flanges for holding a CD for retailers.

The rack has a use after purchase as a storage system. It is one piece instead of having multiple sub components.

Preferably the rack is a molded one-piece plastic frame. It could also be a combination of elements.

The rack has stacking details on the bottom which are used for stacking and for lifting the frame of the rack from full contact with a flat surface. This is to prevent scuffing of the rack on surfaces and to prevent uneven contact of the bottom of the rack and surface and to permit lifting of a loaded rack from a surface. This detail of the eight buttons is used during automation as an alignment feature.

Snaps or locks on the hinged side retain disks into place in the interior of the rack. The snaps or locks are integral with the side portion and mate with perpendicularly disposed end and center supports. The snaps protrude inwardly to allow them to be displaced out of the way so that removal of the CD from the rack is not easily accomplished by someone unfamiliar with the rack. Opposite the snaps are the center and end supports which incorporate snap mating means, slots for upright CDs, and flanges for holding a single CD.

The present CD rack can hold up to two compact disks or one compact disk with graphic card for merchandising or 18 compact disks for storage. Preferably the CD rack is made of plastic.

Eighteen compact disk boxes are held in individual slots, the disk boxes are separated by dividers, which are spaced to allow the disk boxes to tip forward and backward for viewing labels and graphics on faces of individual boxes. The dividers also act as centering spacers when the compact disk retailer-storage rack is used as a retailer to prevent movement of a jewel box during shipping and handling.

The invention provides rack apparatus for disk record media storage cases. An elongated frame has longitudinally extending side walls. Transverse end walls extending parallel to each other are connected between ends of the side walls. A transverse central wall extending parallel to the end walls is connected between centers of the side walls. The end walls have regularly spaced short inward dividers generally parallel to the side walls. The central wall has similar regularly spaced short, oppositely extending dividers extending toward the end walls parallel to the side walls. Flanges near the bottoms of the short protrusions form with the dividers, and extend generally inwardly for holding one or two compact disk storage cases within the rack.

Lips extend inward near upper edges of the side walls and/or central wall, and flanges extend inward near the dividers and beyond the dividers for holding a disk record media storage case between the sidewalls, the dividers, the lips and the flanges. The flanges can include cantilevered ledges extending inward and downward from the dividers.

A sidewall of the invention is longitudinally hinged along an upper edge to allow rotational detachment from the rack and subsequent access to the interior of the rack.

In a preferred form the snaps on the hinged side are integrally formed and inwardly disposed protrusions in the side wall. The protrusions incorporate lips for mating with indentations on the near edges of the end and central walls. The snaps are preferably springs which can be depressed for releasing the lips from the indentations. Inward extending lips on the bottoms of the protrusions cooperate with the indentations to hold a rigid storage case for disk record media upward within the frame. The side wall can be attached to the rack by a living hinge which urges the snap protrusions towards the end/central wall indentations.

Preferably the snap springs are constructed from pairs of parallel protrusions as paired springs with parallel legs. The paired springs mate with side portions of the near edge of the end and central walls, wherein the lips of the snaps meet with indentations on the sides of the walls.

In a preferred embodiment, the transverse central wall and end walls have downward opening U-shaped profiles having spaced inside and outside surfaces generally sloping and diverging downwardly and outwardly. The inner edges of the walls near the hinged side wall have indentations for mating with spring snaps on the side wall.

These and further and other objects and features of the invention are apparent in the disclosure which includes the above and ongoing written description and claims and the drawings.

DETAILED DESCRIPTION OF THE DRAWINGS

Figure 1:
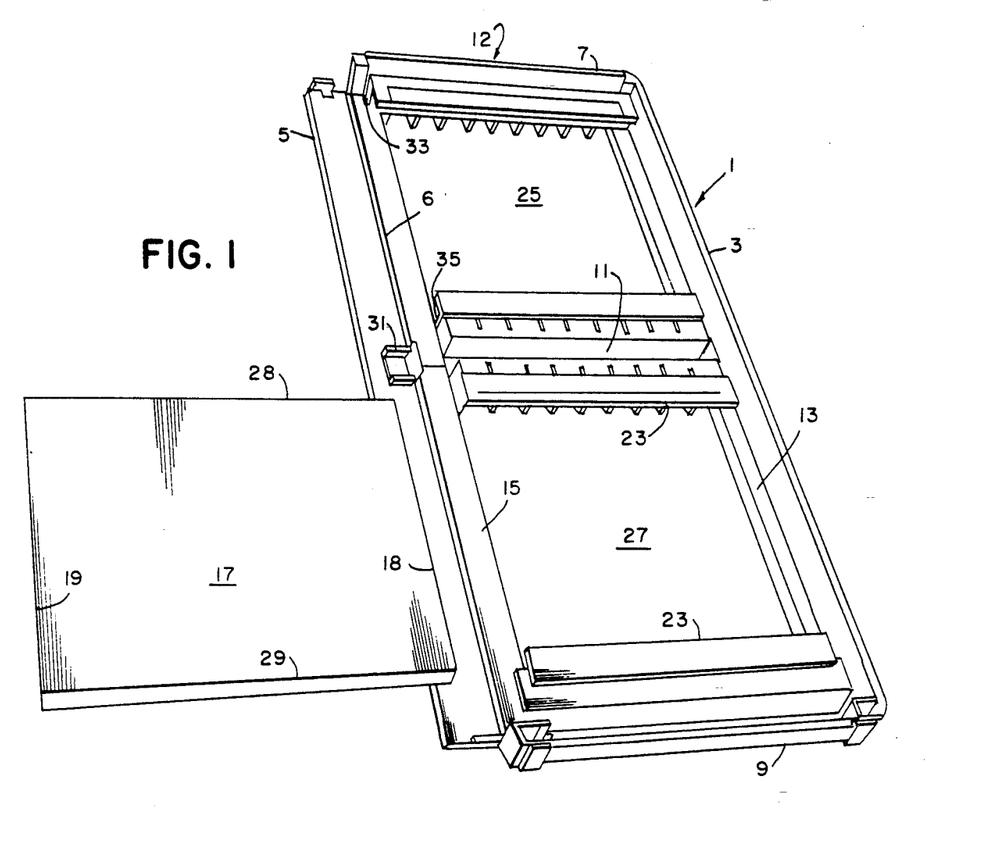
FIG. 1 is an elevational view of the back side of the rack package showing the hinged side door and representative compact disk.
Figure 2:
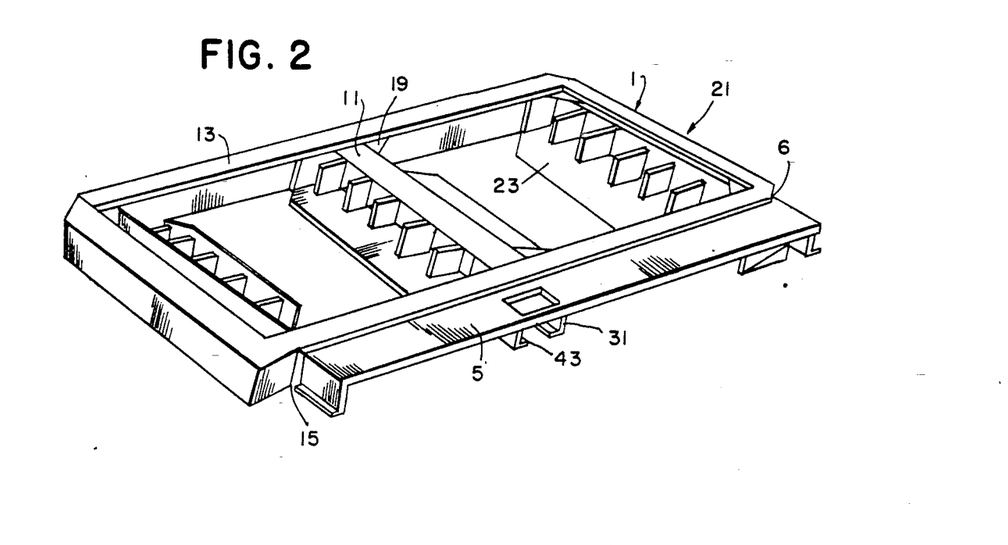
FIG. 2 is a side perspective view of the front and hinged door sides of the rack package.
Figure 3:
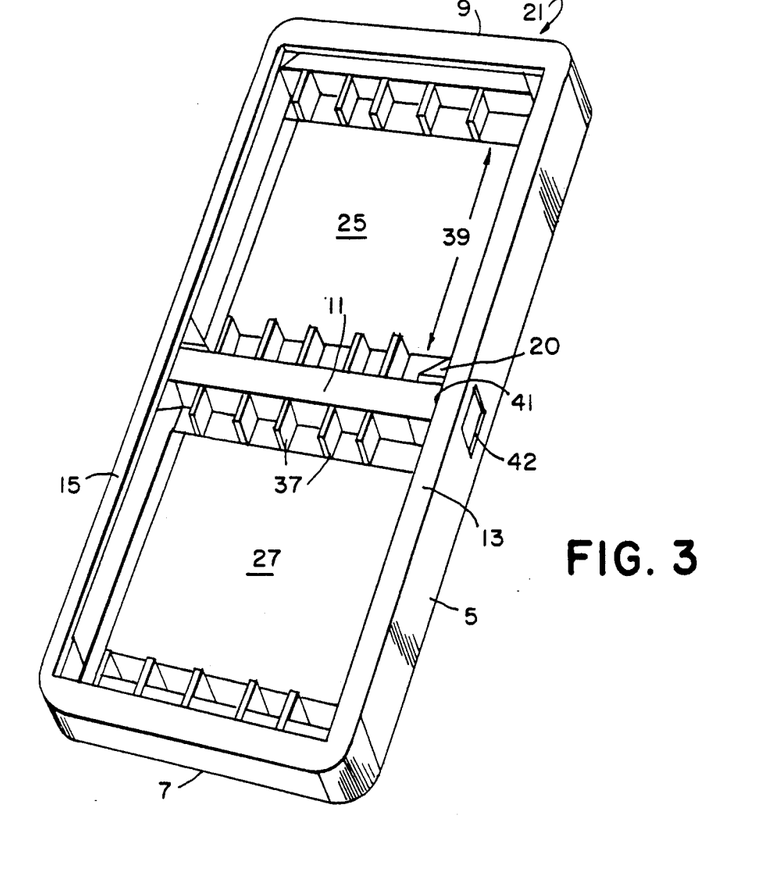
FIG. 3 is a perspective top view of the CD holder showing the closed door.

Referring to FIG. 1, a CD rack frame is generally indicated by the numeral 1. Frame 1 is preferably integrally formed from plastic in die cavities having opposed preformed parts. Alternatively, it can be molded in parts, fitted to completion and glued, heat welded or stamped to retain the frame as shown in FIG. 1. Frame 1 has a generally vertical thin side wall 3 and an opposite hinged side wall 5. End walls 7 and 9 are generally bisected by transverse central wall 11, which lies parallel to the opposite end walls. Upper lips 13 and 15 extend inward from the tops of the side walls 3 and 5. The lips 13 and 15 retain the record media case 17 within the frame 1 inward lying opposite ends 18 and 19 of the case. Case 17 is a conventional compact disk storage case also known as a Philip Jewel Box. The extended lips 13 and 15 also hold within the frame 1 a graphics card (not shown), which is preferably a folded graphics card having dimensions similar to the CD case 17. The graphics card may be replaced by a booklet, pamphlet or by an additional CD case similar to that shown by 17. Tabs 20, as shown in FIGS. 2 and 3, can complement or replace the lips to retain the CD case within the frame along the top face of the frame 1. The tabs 20 engage corners of the case 17, thus holding the case within the frame.

Referring again to FIG. 1, the rear face 22 incorporates retainer flanges 23 positioned on the central wall 11 and opposite end walls 7 and 9. The retainer flanges extend inwardly into plural generally identical first and second retainer windows 25 and 27. The retainer flanges engage case sides 28 and 29 to force the CD case 17 against the lips 13 and 15 or tabs 19 of the front face 21 of the rack, as shown in FIGS. 1 and 2. The result of insertion of the case is a snug fit between the tabs or lips and the opposite flanges to thereby hold the CD case in a plane parallel to those as prescribed by top and rear faces of the CD rack.

Thus far, the invention as described will find utilization by retailers who will secure the CD case(s) and graphics card within the larger frame to enhance display of the product and inhibit theft or damage of the case.

The case 17 is secured within the frame 1 by sliding it between the lips and retainers until it abuts vertical side wall 3, and subsequently closing and locking hinged side wall 5 with the CD case in place. The hinged side wall 5 incorporates an integral hinge 6 adjoining the adjacent upper lip 15. The hinge can be produced during molding of the apparatus, stamped or perforated after the molding process is completed or provided for by other means known in the art. Alternatively, non-integral hinges can be incorporated without varying from the scope of the invention. Springs, not shown, can be included to supplement the action of the hinge 6.

The hinged side wall also incorporates a means for holding or retaining the door in a vertical position similar to the opposite side wall 3. These side wall retaining means will hereafter be referred to as snaps or locks and be represented by the numeral 31, as shown in FIG. 1. In the preferred embodiment, the snaps are springs integral with the side wall which engage near edges 33 and 35 of the end or central walls respectively. The details of the hinged door operation will be described further in later figures.

Figure 7:
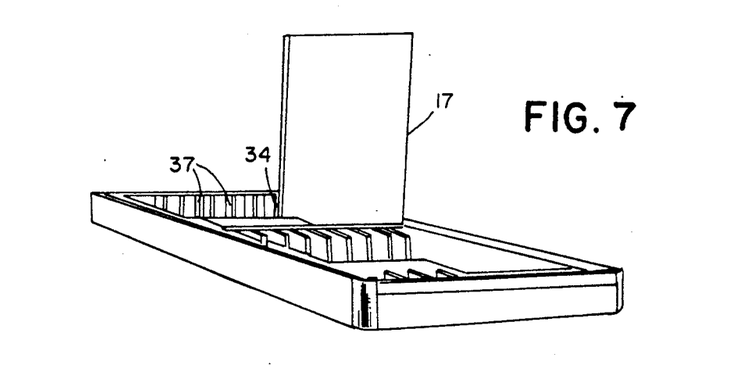
FIG. 7 is a perspective view of the package supporting a compact disk in an upright position between multiple slots in the transverse and end walls.

As shown in FIGS. 2 and 3, the bisecting transverse central wall 11 and opposite end walls 9 and have regularly spaced dividers 37 which extend from the central wall and end walls inwardly towards the opposite wall. Each window 25 and 27 can incorporate up to nine pairs of dividers 37 to thereby hold up to 18 CDs upright within the mated slots 39 within the frame. As shown in FIG. 7, the CD case 17 is upright and engaged by dividers 37 and held within slot 39 along the bottom corners of the CD. It is not beyond the scope of the present invention to vary the numbers of opposite dividers to vary the size of the slots. In doing so, the slots can be constructed so as to have a width substantially the same as the width of the CD, causing the CD to be held rigidly in the upright position, as in FIG. 7. Alternatively, the slots can be widened by lessening the numbers of dividers, allowing the CD to be rotated forwards or backwards with the mated slots as its axis to allow the user to page through a number of CD cases in series. The dividers 37 may take any suitable form, such as aligned pegs or the thin vane-like partitions as shown in the drawings, which are capable of performing two functions. The obvious function is for holding the CDs in the upright position. Another function is for centering the case 17 or graphics card between the opposite transverse central wall and end walls in cooperation with the side walls 3 and 5 when the case and card are inserted into the window. This helps in displaying the goods for retailers. Both functions of the dividers 37 may be accomplished by the end vanes shown in the drawings, by rows of pins or pegs, by appropriately sized beads or by other similar dividers.

FIG. 2 shows an elevational side view detailing the snaps 31 of a preferred embodiment. The snaps 31 are preferably springs integral with the side wall, which incorporate hooks 43 at their ends distal from the hinged side wall 5. The side wall 5 can also incorporate a longitudinal shelf 45 for providing a better fit between the side wall and the frame when the hinged side wall is rotated and locked into the frame. The longitudinal shelf also serves as a fail safe mechanism wherein, if the side wall is inadvertently opened while the CD is within the frame, the shelf will catch the edge of the case 17 and prevent it from falling out of the frame and breaking. FIG. 2 also shows an alternate embodiment for the retainer flanges 23. The flanges can be trapezoidal structures extending inward towards the center of the window from the end or central walls. Preferably, the shorter base of the trapezoids are the most inward edges of the extensions. It is not beyond the scope of the invention to incorporate semicircular retainer flanges or similarly shaped flanges. Also, a retainer flange can be a plastic strip or strips running across the entire rear face of the frame and connecting to the end and central wall.

Figure 4:
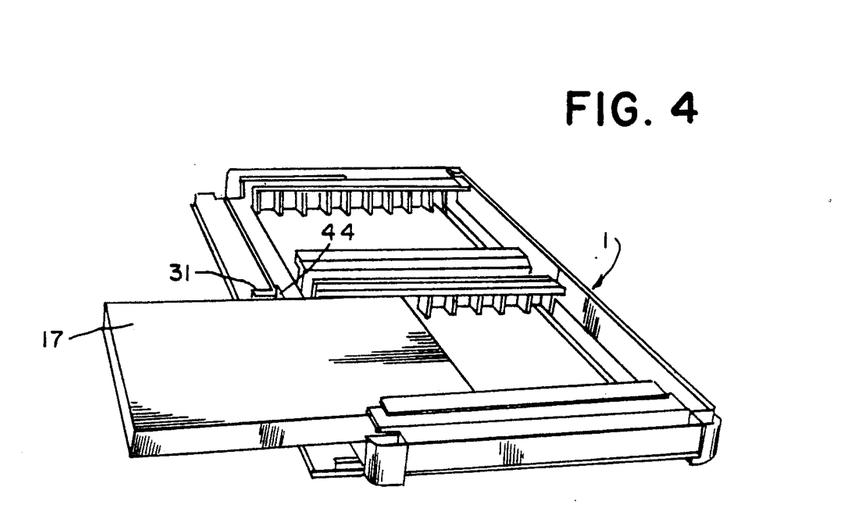
FIGS. 4, 5 and 6 are perspective views showing insertion of a representative CD through the open side door, compact disk fully inserted and held into place by retaining flanges, and compact disk locked into place by the closed side door, respectively.
Figure 5:
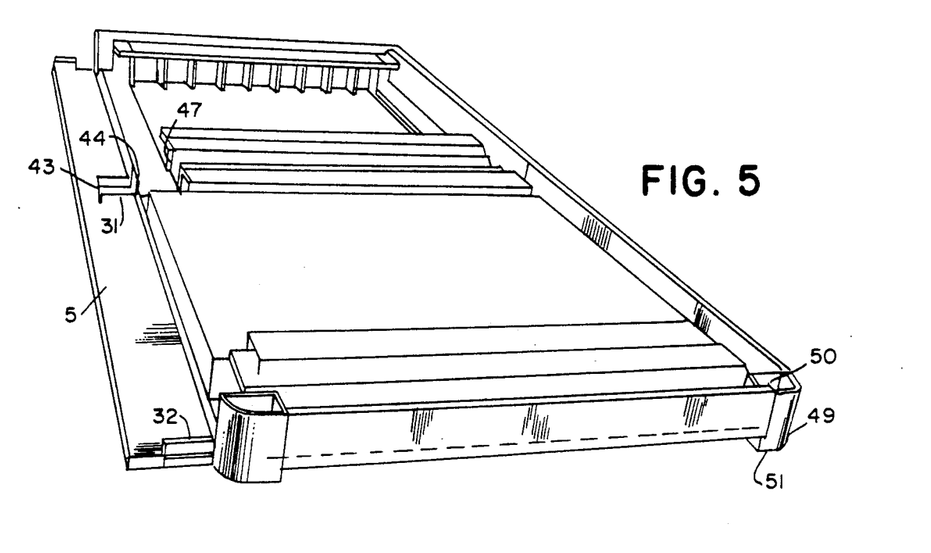
Figure 6:
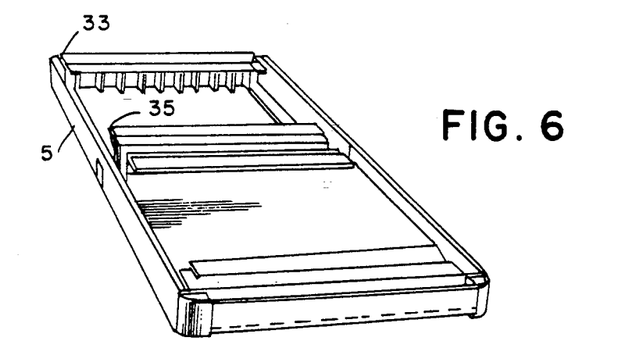

FIGS. 4, 5 and 6 show the insertion of the CD case 17 into the frame 1 and subsequent rotation of the hinged side wall 5 into the locked position against the near edges 33 and 35 of the end and central walls with the CD held within the case. FIG. 5 shows the snaps 31 of the side wall 5. The snaps incorporate hooks 43 which engage complementary protrusions 47 incorporated into the near ends of the transverse walls. FIG. 5 also details frame corners 49, which can serve several functions. In a first embodiment, the corners can be locking mechanisms for the various pieces of the rack package if the frame is not integrally molded. The end walls and side walls can be fit into slots or holes provided in the corners and adhered or snapped thereto. In another embodiment, the corners 49 can be provided with a hollow base 50 and a tapered top 51, which are complementary in size. The tapered tops can extend beyond the front face of the frame, thus enabling the tapered tops of the corners of one frame to fit into the hollowed bases of another frame stacked on top of the first frame. Alternatively, the corners can incorporate complementary buttons and indentations provided on the top and bottom respectively to enable mated stacking of plural packages.

Referring again to FIGS. 2 and 3, counter tabs 41 or counter apertures 42 are provided for releasing the snaps and hooks from the near edges of the transverse walls. The counter tabs actuate the movement of the snaps to disengage the hooks 43. Alternatively or in conjunction therewith, the counter aperture allows the user to access and depress the snaps away from the protrusion. In either case, the tabs or apertures would provide a means for allowing the retailer to easily access the CD case or graphics card, but would deter others who were not familiar with the workings of the rack package.

Figure 8:
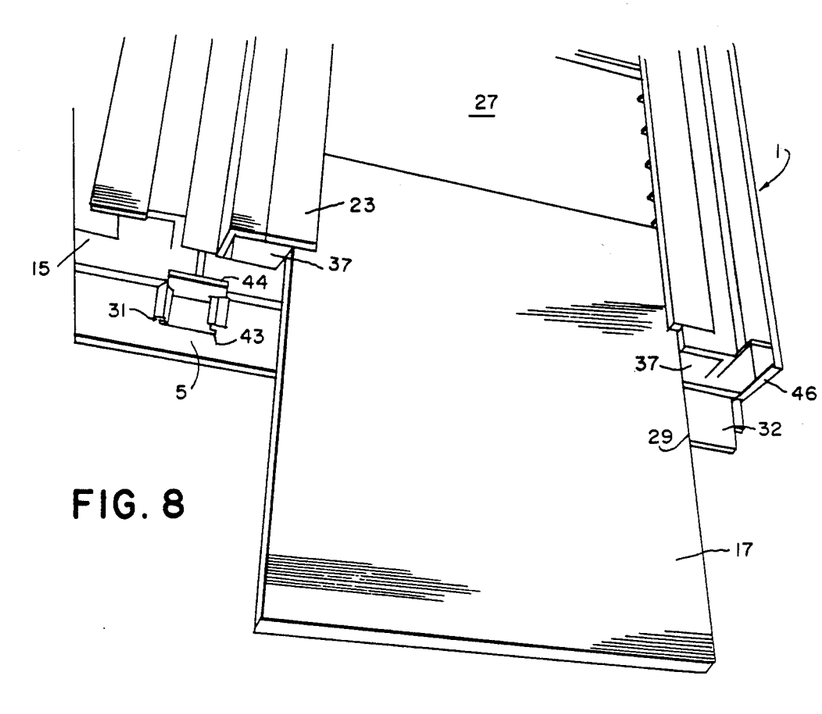
FIG. 8 is an elevated side view of the open side door showing the center and side snaps and method of insertion of the CD under retaining flanges.

FIG. 8 is a side view of a case 17 being inserted into the open side, as provided by the hinged side wall 5. The sides of the case 28 and 29 are held under the opposite retainer flanges 23 and pushed into the window 27 of the frame 1. The dividers 37 center the case within the frame.

An alternative side wall locking means is detailed in FIG. 8, wherein the snaps 31 and hooks 43 engage a vertical side wall shelf 44 extending downward from the lip 15 when in the closed position. Side wall edge snaps 32 can engage corner shelves 46 extending from the corners of the frame.

Figure 9:
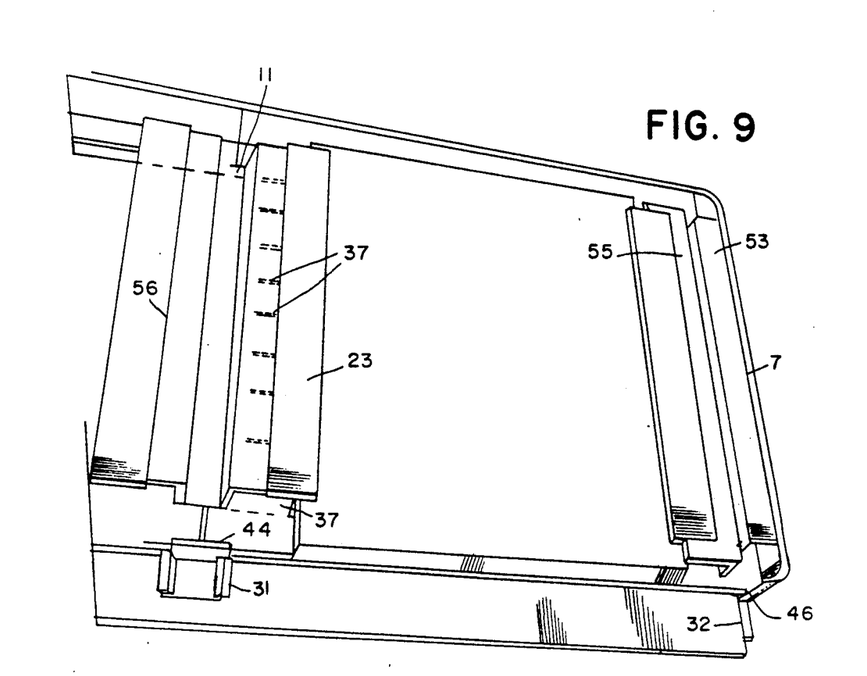
FIG. 9 shows the view of FIG. 8 with the CD fully inserted.
Figure 10:
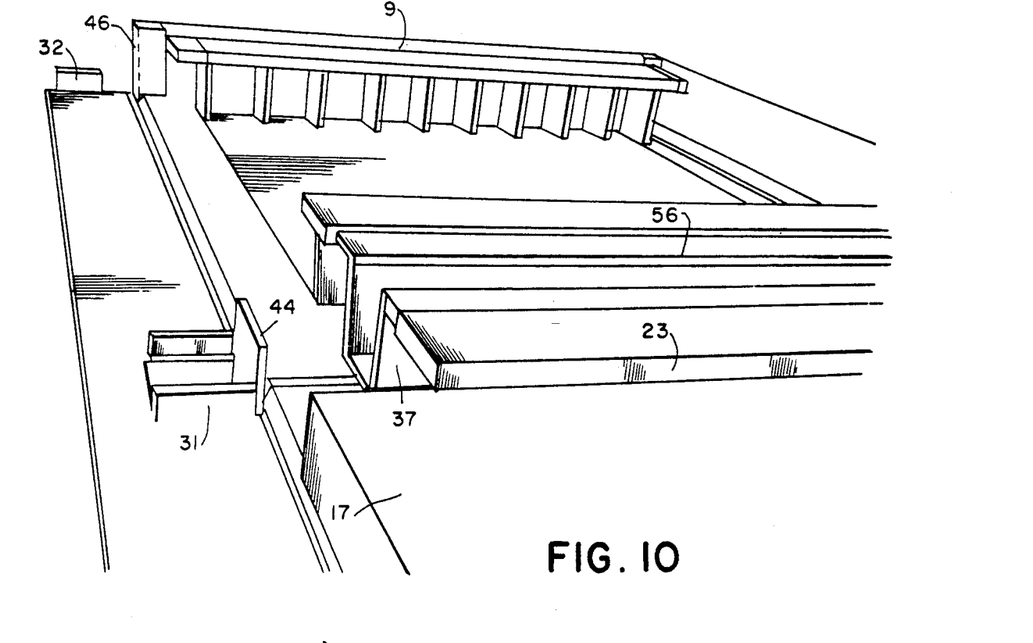
FIG. 10 is a perspective top view showing the side door, snaps and snap mating means on the central wall, and slots with dividers for holding the CD in the upright position.

FIGS. 9 and 10 further show the inserted case 17 engagement of the edges of the case with the retainer flanges 23, centering of the case by the dividers 37, vertical side wall shelf 44, and corner shelf 46, side wall central snap 31 and side wall edge snap 32. Also shown, the transverse central wall 11 and end wall 7 and 9 have hollow forms with inner and outer surfaces 53 and 55. As shown in the drawings, the surfaces of the transverse wall are slightly sloped for withdrawal after molding. The dividers 37 serve to strengthen the hollow transverse walls and further strengthen the inwardly extending retainer flanges 23, which are lateral extensions from the upper edges 56 of the hollow, U-shaped transverse walls.

Figure 11:
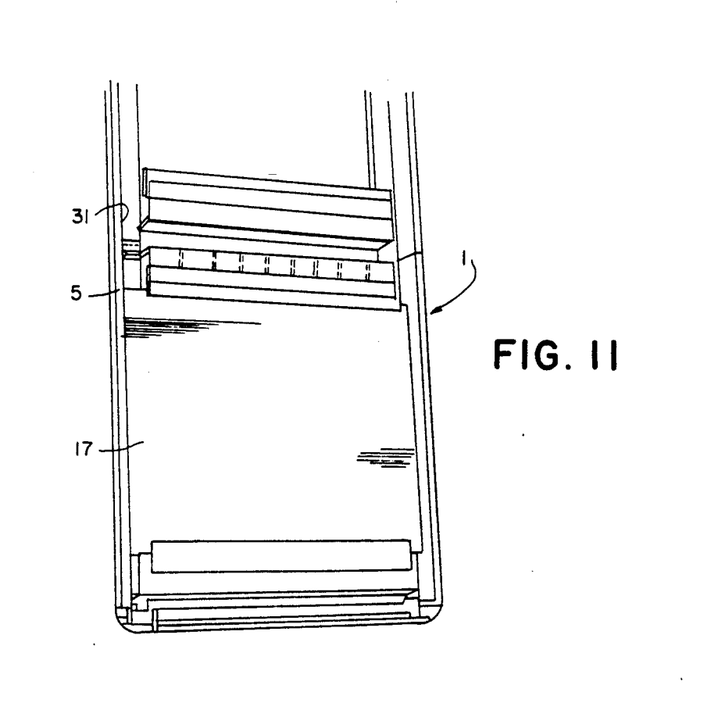
FIG. 11 is a rear view of the CD rack showing the closed side door and retainer flanges.

FIG. 11 shows a rear view of the closed side wall 5 and the case 17 inserted into the frame 1. The snaps 31 are engaging the vertical side wall shelf, which is hidden by the hinged side wall in the drawing.

Figure 12:
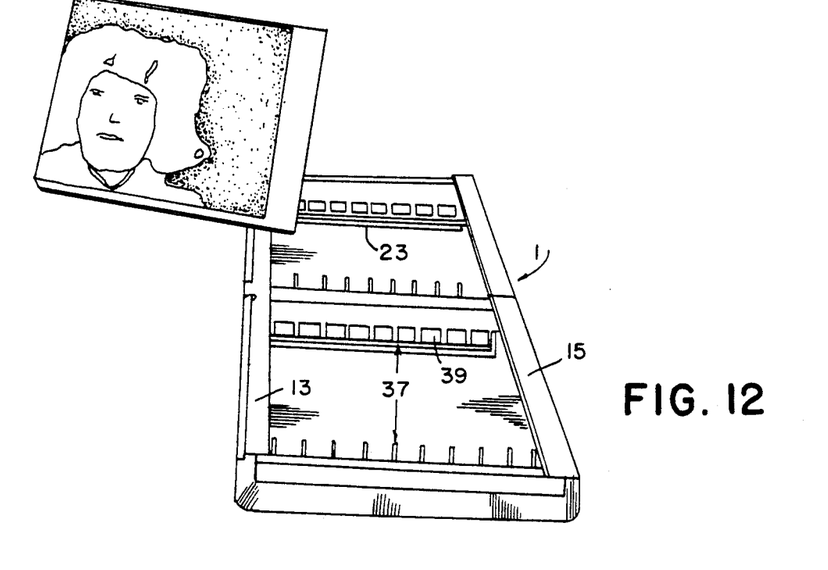
FIGS. 12 and 13 are elevated frontal views showing the details of the plural mated slots within the two compartments of the CD rack.
Figure 13:
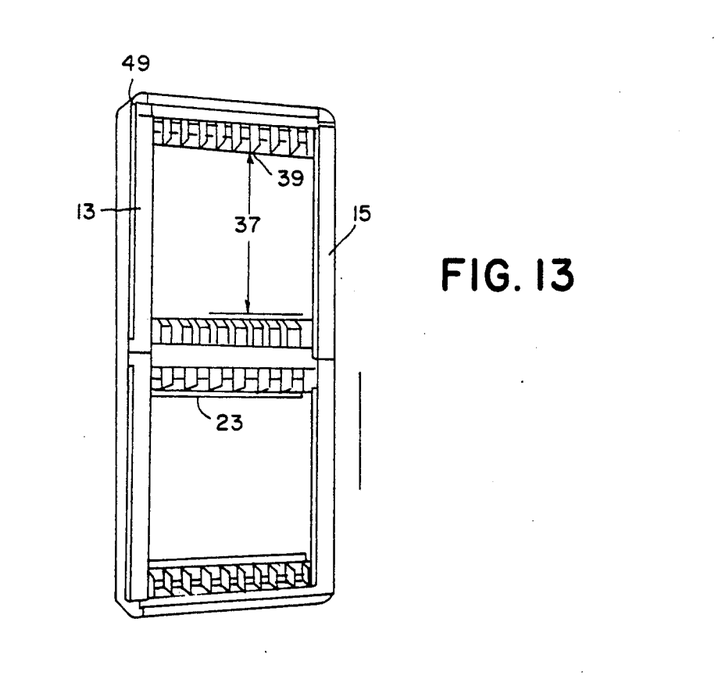

FIGS. 12 and 13 show front views of the mated dividers 37, which prescribe CD holding slots 39 for holding plural CDs upright. Upper lips 13 and 15 engage upper portions of the case while retainer flanges 23 engage the bottom of the case, thereby holding the case flat within the frame. Thus, the surfaces of the case are protected from damage during handling. The distance of a storage case above and below the supporting surface is further increased by the thickness of the extensions of the corners 49 above or below the faces of the case. However, the storage rack adds very little to the thickness of a CD box during use as a retail package, and thus does not add costs in shipping, storage or displaying.

While the invention has been described with reference to specific embodiments, modifications and variations may be constructed without departing from the scope of the invention, which is defined in the following claims.

I claim:

1. Rack apparatus for disk record media storage cases comprising an elongated frame having longitudinally extending side walls, said sidewalls comprising a stationary sidewall and a disengageable sidewall, transverse end walls extending parallel to each other and connected between ends of the side walls and a transverse central wall extending parallel to the end walls and connected between centers of the side walls, the central wall dividing the rack into two substantially equal compartments, the end walls having regularly spaced short inward dividers generally parallel to the side walls and the central wall having similar regularly spaced short dividers extending opposite to and towards the short inward dividers of the end walls parallel to the side walls, retainer flanges extending near the bottoms of the short dividers; said disengageable side wall having disengagement means for allowing side access to the interior of the rack apparatus; the apparatus further comprising a compact disk storage case rack for holding plural compact disk storage cases generally upright between the short inward dividers and the short dividers.

2. The apparatus of claim 1 further comprising upper flanges extending outward from upper edges of the end walls and central wall and inward substantially parallel to the bottoms of the short dividers, forming complementary shelves for holding a disk record media storage case between the stationary sidewall, the disengageable sidewall, the central wall, and the end walls.

3. The apparatus of claim 2, wherein the upper flanges extend inward beyond the ends of the short dividers.

4. The apparatus of claim 3, wherein the upper flanges further comprises flattened trapezoidal structures with the longer base being integrally attached to the end and central walls, and the shorter top of the trapezoidal structure extending inward towards each complementary shelf, extending oppositely from the central and the end walls.

5. The apparatus of claim 1, further comprising the disengagement means having a hinge provided between the rack and the side wall for allowing the side wall to disengaged and swung open to allow access to the interior of the CD rack.

6. The apparatus of claim 1, wherein the disengageable side wall is provided with snaps which engage each near end of the central and end walls.

7. The apparatus of claim 6, wherein the snaps further comprise inwardly protruding springs having hooks at their ends for engagement of complementary flanges provided at the near ends of the central and end walls.

8. The apparatus of claim 7, wherein the disengageable side wall is provided with apertures adjacent the springs for allowing access to the springs for disengagement of the side wall with the ends of the central and end walls.

9. The apparatus of claim 2, wherein the shelves comprise lower flanges extending from the transverse walls at the bottoms of the dividers, the lower flanges cooperating with the walls and dividers for supporting rigid cases for disk media upright in aligned conditions, when the frame is used as a CD rack.

10. The apparatus of claim 9, further comprising buttons extending from the outer faces of the lower flanges for supporting the frame above a surface on which the frame rests.

11. The apparatus of claim 2 wherein the transverse central wall and end walls have downward opening U-shaped profiles having spaced inside and outside surfaces generally sloping and diverging downwardly and outwardly.

12. The apparatus of claim 11 further comprising support webs positioned in the walls between the inside surfaces.

13. The apparatus of claim 1 further comprising downward extending buttons formed on under surfaces of the frame for spacing the frame from a surface on which it rests.

14. The apparatus of claim 11, wherein the shelves of the rack are integral extensions from the open edges of the U-shaped profile, wherein the extensions make substantially right angles away from the opening.

15. The apparatus of claim 14, wherein the spaced dividers are formed and attached to the transverse walls and the dividers, said extension extending beyond the attachment to provide a shelf for the disk record media storage case.

* * * * *